US012688600B2

(12) United States Patent
Fichman et al.

(10) Patent No.: US 12,688,600 B2
(45) Date of Patent: Jul. 21, 2026

(54) ESTABLISHING INTERACTIONS BETWEEN DYNAMIC OBJECTS AND QUASI-STATIC OBJECTS

(71) Applicant: Juganu Ltd., Or-Yehuda (IL)

(72) Inventors: Dani Fichman, Raanana (IL); Alexander Bilchinsky, Ganey-Tikva (IL); Eran Ben-Shmuel, Savyon (IL); Gal Zuckerman, Holon (IL)

(73) Assignee: Juganu LTD., Or-Yehuda (IL)

( * ) Notice: Subject to any disclaimer, the term of this patent is extended or adjusted under 35 U.S.C. 154(b) by 456 days.

(21) Appl. No.: 18/299,275

(22) Filed: Apr. 12, 2023

(65) Prior Publication Data

US 2024/0312046 A1 Sep. 19, 2024

Related U.S. Application Data

(63) Continuation of application No. 18/184,983, filed on Mar. 16, 2023, now abandoned.

(51) Int. Cl.
*G06T 17/00* (2006.01)
*G06T 7/13* (2017.01)
(Continued)

(52) U.S. Cl.
CPC ................. *G06T 7/70* (2017.01); *G06T 7/13* (2017.01); *G06T 7/20* (2013.01); *G06T 17/20* (2013.01);
(Continued)

(58) Field of Classification Search
CPC .... G06T 7/70; G06T 7/13; G06T 7/20; G06T 17/20; G06T 17/00; G06V 10/764; G06V 2201/07; G06V 20/52; H04W 36/322
See application file for complete search history.

(56) References Cited

U.S. PATENT DOCUMENTS 12,175,577 B1    12/2024   Campbell
2019/0306463 A1   10/2019   Zuckerman et al.
(Continued)

FOREIGN PATENT DOCUMENTS

WO    WO-2020065384 A1 *   4/2020   ........... H04B 7/0617

OTHER PUBLICATIONS

Lu, Yi, et al. "Feasibility of location-aware handover for autonomous vehicles in industrial multi-radio environments." Sensors 20.21 (2020): 6290. (Year: 2020).*

*Primary Examiner* — Andrew M Moyer
*Assistant Examiner* — Dylan John Mendez Muniz
(74) *Attorney, Agent, or Firm* — Intrinsic Law Corp.

(57) ABSTRACT

System and methods for visually tracking movement associated with a mobile device in order to determine optimal locations for handing over the device between different base stations arranged in a sequence. Initially, a current location of the mobile device is determined via a radio access network associated with the device. Then, a moving object is visually detected in an immediate proximity to the location determined, using a visual sensor array associated with the radio access network. The moving object detected is assumed to be associated with the mobile device due to said proximity, and is hence visually tracked along its path of progression, until arriving at a location that was previously determined to be optimal for performing a handover between two adjacent base stations. A handover is then executed, while continuing with said visual tracking until another handover is required.

17 Claims, 11 Drawing Sheets

(51) Int. Cl.

| | | |
|---|---|---|
| *G06T 7/20* | (2017.01) | |
| *G06T 7/70* | (2017.01) | |
| *G06T 17/20* | (2006.01) | |
| *G06V 10/764* | (2022.01) | |
| *G06V 20/52* | (2022.01) | |

(52) U.S. Cl.
CPC ........ *G06V 10/764* (2022.01); *G06V 2201/07* (2022.01)

(56) References Cited

U.S. PATENT DOCUMENTS

| | | | |
|---|---|---|---|
| 2020/0082614 A1 | 3/2020 | Xu et al. | |
| 2020/0175284 A1* | 6/2020 | Viswanathan | ............ G06T 7/97 |
| 2021/0033404 A1 | 2/2021 | Lawlor et al. | |

* cited by examiner

1edge1

1network

1network

1edge2                    1server/s

1network

1edge3

4cross-image/s

1generate4

4cross-QSGFD

4cross-3D-coordinate

This is a crosswalk area

4cross-classification

1001 — Generate quasi-static geo-functional descriptions of quasi static objects in a certain area 1002 — Further generate geo-temporal descriptions of dynamic objects in the certain area 1003 — Associate the geo-temporal descriptions with the geo-functional descriptions 1011 — Receive information regarding current location of a mobile client device 1012 — Visually detect a moving object near the current location 1013 — Visually track the moving object 1014 — Initiate handover/s in conjunction with said visual tracking

ESTABLISHING INTERACTIONS BETWEEN DYNAMIC OBJECTS AND QUASI-STATIC OBJECTS

CROSS-REFERENCE TO RELATED APPLICATIONS

This application is a continuation of U.S. patent application Ser. No. 18/184,983, titled "Establishing Interactions Between Dynamic Objects and Quasi-Static Objects," filed on Mar. 16, 2023, which is hereby incorporated by reference.

TECHNICAL FIELD

This application relates generally to radio access networks.

BACKGROUND

A cellular communication device on the move, such as a smartphone in a moving car, may require switching/handing-over between different base stations of a radio access network as the device goes in and out different reception areas. With recent proliferation of Micro and Pico base stations having a limited coverage, such handover events may become too frequent to allow a continuous reception along a path of progression, especially as getting out of a reception area of a certain base station can occur almost instantaneously thereby preventing the radio access network to successfully execute a make-before-break handover.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

One embodiment is a system operative to utilize visual cues to predict handover events in conjunction with radio-access-networks, comprising: a plurality of network-enabled optical sensors distributed across a certain geographical area so as to facilitate visual coverage thereof; and a first network-enabled computer communicatively connected to the visual sensors, in which the computer is operative to receive visual information from the optical sensors; and a second network-enabled computer communicatively connected to the first computer and operative to maintain communicative contact with various mobile client devices currently attached to various base station nodes of a radio-access-network; wherein the system is configured to: receive, in the second network-enabled computer, via the radio-access-network, information regarding a current location of a specific one of said mobile client devices currently on the move and currently attached to a particular one of the base station nodes; process, in the first network-enabled computer and in conjunction with said information regarding the current location of the specific mobile client device, the visual information received, and consequently visually detect and track movement associate with said specific mobile client device that is on the move; and predict, using said visual tracking, and using at least one criterion, an exact time to initiate a handover operative to detach the specific mobile client device from the particular base station node and to attach the specific mobile client device to a different one of the base station nodes.

One embodiment is a method (FIG. 5) for utilizing visual cues to predict handover events in conjunction with radio-access-networks, comprising: receiving, in conjunction with a radio-access-network associated with a sequence of base station nodes located along a certain path, information regarding a current location of a mobile client device currently on the move along said path and currently attached to one of the base station nodes; detecting, using a sequence of visual sensors located along said path, a moving object that is within no more than 10 (ten) meters from said current location, while assuming that the mobile client device is in and/or with the moving object detected; tracking, using the sequence of visual sensors, the moving object along said path; and initiating a sequence of handover events, in which each of the handover events is initiated when the moving object has been tracked to arrive at one of a list of locations along the path that are designated as handover locations.

BRIEF DESCRIPTION OF THE DRAWINGS

For a fuller understanding of the nature and advantages of the concepts disclosed herein, reference is made to the detailed description of preferred embodiments and the accompanying drawings. The embodiments are herein described by way of example only, with reference to the accompanying drawings. No attempt is made to show structural details of the embodiments in more detail than is necessary for a fundamental understanding of the embodiments.

DETAILED DESCRIPTION

Figure 1A:
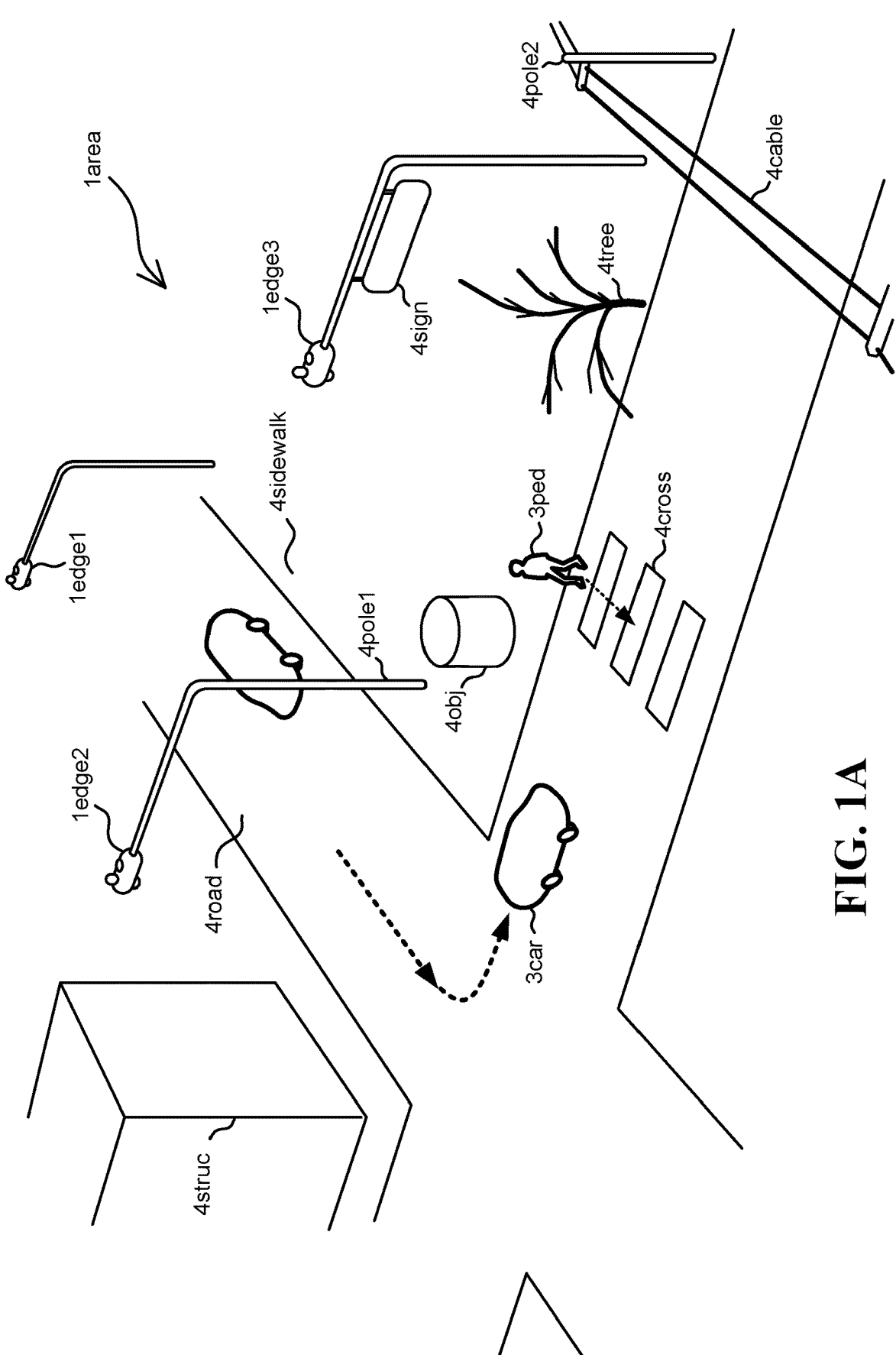
FIG. 1A illustrates one embodiment of an outdoor area comprising dynamic objects interacting with quasi-static objects and further comprising edge sensors operative to detect the various objects and related interactions.

FIG. 1A illustrates one embodiment of an outdoor area 1*area* comprising dynamic objects interacting with quasi-static objects and further comprising edge sensors operative to detect the various objects and related interactions. Area 1*area* includes dynamic objects such as vehicles 3*car* and pedestrians 3*ped*, as well as quasi-static objects such as buildings 4*struc* and other structures 4*obj*, roads and streets 4*road*, sidewalks and trails 4*sidewalk*, crosswalks and other on-road markings 4*cross*, trees and other vegetation 4*tree*, poles 4*pole*, signs 4*sign*, and cables 4*cable*. A quasi-static object is an object that is essentially stationary and does not shift position, but which may exhibit some local movement such as tree branches moving in the wind, or a pole getting bent over time. The area at hand 1*area* is depicted as being an outdoor area, but it may also be an indoor area, such as the interior of a shopping mall having quasi-static or static objects such as shops and benches, and dynamic objects such as shoppers moving around.

Several edge devices 1*edge* are shown, that include visual sensors operative to visually capture both the quasi-static objects and the dynamic objects. The edge devices 1*edge* are spread over the area of interest 1*area* so as to have good visibility of the various objects. For example, 1*edge*1 is located at a far end of the road 4*road* so as to visually capture vehicles entering the area of interest 1*area*, 1*edge*2 is located near an intersection so as to visually capture a nearby building 4*struc* with people entering/exiting, to visually capture a nearby crosswalk 4*cross* with pedestrians 3*ped* crossing, and to visually capture vehicles moving and parking nearby. Other edge devices 1*edge*3 may be used to completely cover the entire area of interest 1*area*.

It is noted that it may be beneficial to have a complete visual coverage of the entire area of interest 1*area*, but a partial visual coverage is also helpful, especially when not enough locations are available for placing the edge devices 1*edge*, either as a result of environmental conditions/considerations and/or other considerations such as cost of deployment and maintenance.

Edge devices 1*edge* are depicted as being located at elevated positions using poles, which is beneficial for better visual coverage of the area of interest 1*area*. However, the edge devices may be placed at the street level or other levels, or may be elevated using other arrangements than poles, e.g., using buildings and other structures. The edge devices 1*edge* may be standalone devices, or they may piggyback other devices such as traffic lights, street illumination devices, surveillance equipment, signs, cellular base stations, and/or other stationary infrastructure.

Each of the dynamic and quasi-static (or completely static) objects may be visually captured by only one of the edge devices 1*edge* or may be visually captured by several of the edge devices. For example, crosswalk 4*cross* may be visually captured by both 1*edge*2 and 1*edge*3, providing many benefits such as better combined resolution and triangulation capabilities that may add accuracy to determining geo-positions and geometric dimensions of the crosswalk.

Some of the quasi-static objects, such as a road 4*road*, may extend over relatively long distances and therefore come in and out of several fields of view of the different edge devices 1*edge*. For example, 1*edge*1 may be able to see only the beginning of road 4*road*, 1*edge*2 may be able to see only the intersection part of road 4*road*, and 1*edge*3 may be able to see only the end of road 4*road*, and therefore, the combined imagery data gathered from the three edge devices may be used to determine geo-positions and geometric dimensions of road road4. The geo-positions and geometric dimensions of road road4 may be determined accurately throughout the length of the road when the fields of view of adjacent edge devices overlap. In addition, the geo-positions and geometric dimensions of road road4 may be determined when there are gaps in visual coverage between adjacent edge devices, in which case extrapolation and machine-learning techniques may be utilized to close the visual gaps.

Figure 1B:
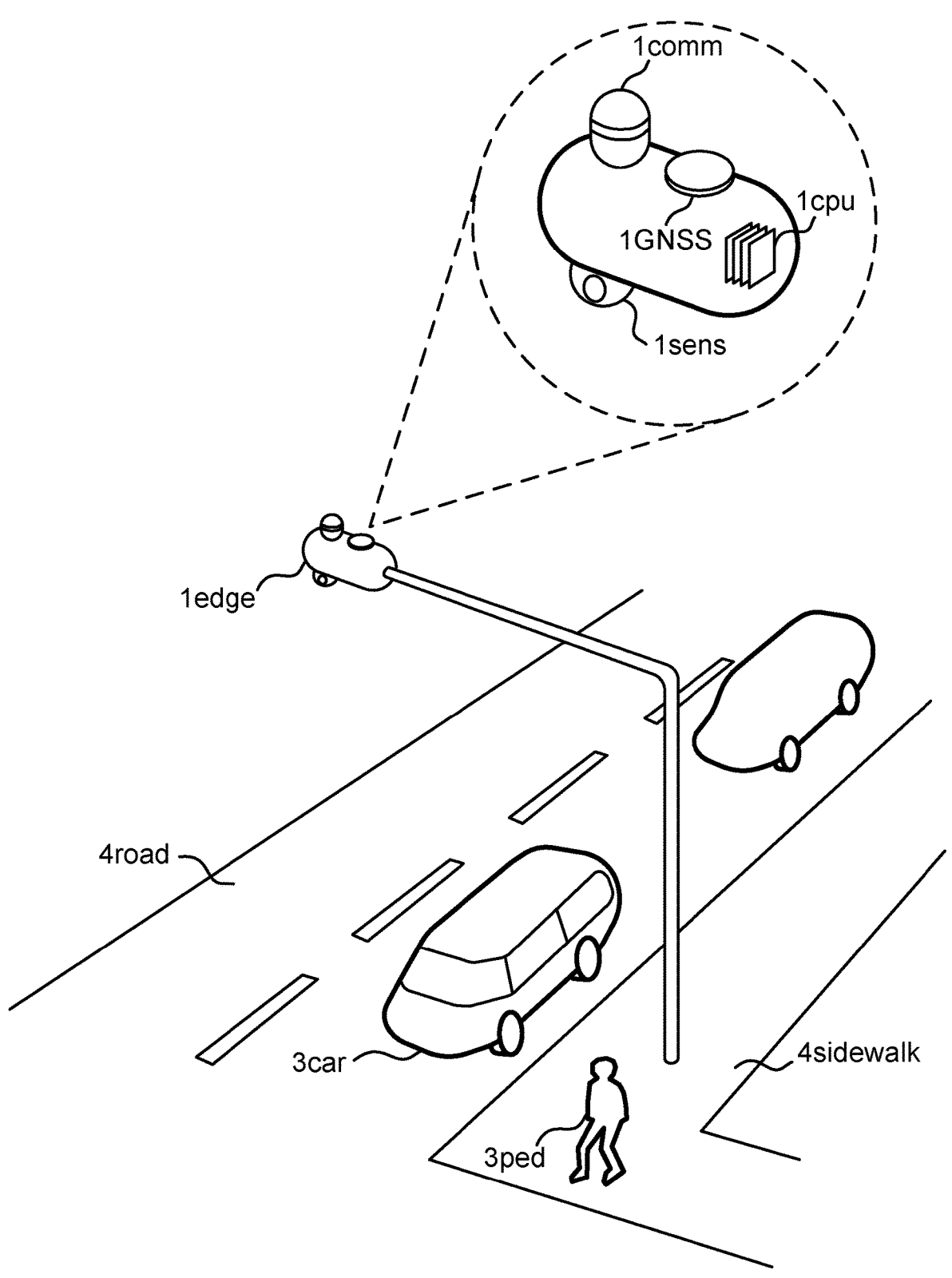
FIG. 1B illustrates one embodiment of an edge device and associated components that are placed at a location facilitating good visibility of surrounding environment.

FIG. 1B illustrates one embodiment of an edge device 1*edge* and associated components that are placed at a location facilitating good visibility of surrounding environment. The edge device includes an optical sensor 1*sens* such as a visible light camera, an infrared camera, a lidar, an RGB (red-blue-green)-Depth sensor, and/or a stereo camera. The optical sensor is used to visually capture quasi-static objects (e.g., 4*road*, 4*sidewalk*) and dynamic objects (e.g., 3*car*, 3*ped*) surrounding the edge device. The edge device may further include a global navigation satellite system (GNSS) receiver 1GNSS such as a GPS (Global Positioning Service) receiver that is used to determine the geo-spatial coordinates of the edge device, a communication subsystem 1*comm* operative to communicatively connect the edge devices with other networked elements, and an onboard computer 1*cpu* operative to at least partially process imagery data captured by the optical sensor. The edge device 1*edge* is depicted as being mounted on a pole, but it may be mounted on other objects, or it may be placed at the street level.

Figure 1C:
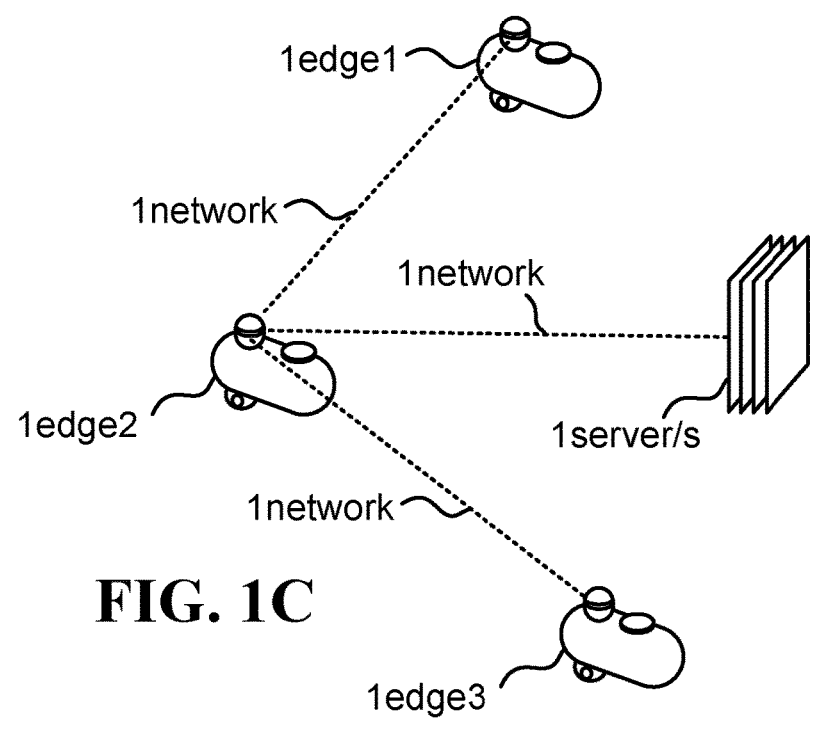
FIG. 1C illustrates one embodiment of the edge device communicating over a network with other edge devices and servers.

FIG. 1C illustrates one embodiment of the edge device 1*edge*2 communicating over a network 1*network* with other edge devices 1*edge*1, 1*edge*3 and servers 1*server*/s. The network may be associated with a cellular network, a WiFi network such as a mesh network, a microwave/millimeter-wave backhaul, a satellite communication link, or a wired network such as Ethernet, fiber, or a telephone line. The network is depicted as related to a tree topology, but it may be related to other topologies such as a mesh topology or a star topology, and convey data using known communication methods such as packet switching or circuit switching, in a point-to-point, in a point-to-multipoint fashion, or in other fashions.

Figure 2A:
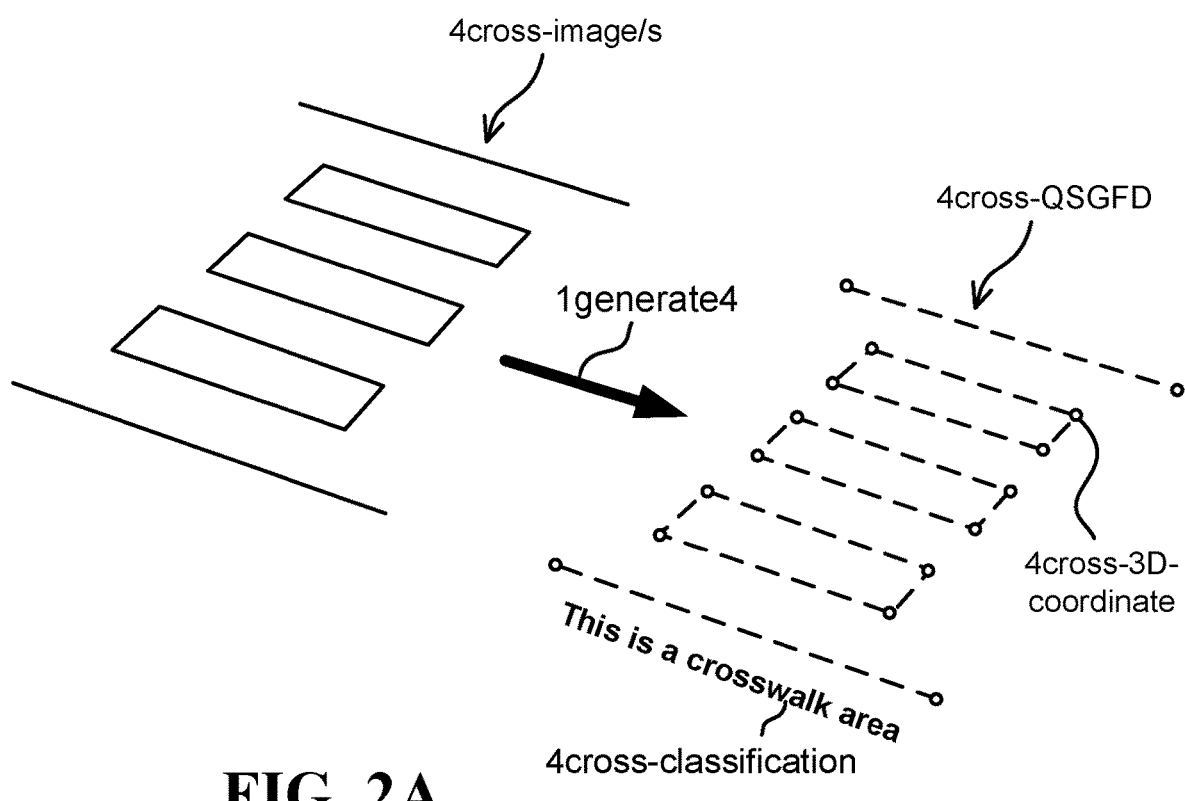
FIG. 2A illustrates one embodiment of a quasi-static object imagery and a representation derived from the quasi-static object imagery including three-dimensional and semantic information.

FIG. 2A illustrates one embodiment of a quasi-static object imagery and a representation derived from the quasi-static object imagery including three-dimensional and semantic information. The imagery 4*cross-image/s* was captured by one of the edge devices 1*edge* and is a depiction of a crosswalk 4*cross*, which is a quasi-static object. Quasi-static objects, by their nature, are subject to minimal movements, and therefore imagery 4*cross-image/s* may actually be a sequence of images taken by the edge device over a certain period of time that may be measured in seconds (e.g., more than one second), minutes (e.g., more than one minute), hours (e.g., more than one hour) or even days (e.g., more than one day) and/or weeks (e.g., more than one week). Capturing long image sequences of quasi-static objects may have several benefits, including the ability to "integrate" the images over a long period of time to "remove" dynamic/temporary visual obstructions such as, in the case of a crosswalk 4*cross*, caused by pedestrians 3*ped* crossing over and vehicles 3*car* passing above. Other benefits include improving spatial resolution using image-combining techniques such as super-resolution algorithms, resistance to changing lighting and atmospheric conditions (e.g., day/night, fog, rain, and/or sun blinding), and/or accounting for slow/minor changes to quasi-static objects over time.

After capturing sequences of a quasi-static object imagery, e.g., the sequence 4*cross-image/s* depicting a crosswalk 4*cross*, the sequences are processed using image processing and/or machine-learning techniques in order to generate 1*generate4* a quasi-static geo-functional description (QSGFD) 4*cross*-QSGFD of the specific object, which is a way to describe the specific quasi static object from both a geometric perspective and a functional perspective. For example, from a geometric perspective, 4*cross*-QSGFD may describe a geometric location of the respective crosswalk 4*cross*: e.g., using a 3-dimensional (3D) representation of the crosswalk including 3D spatial coordinates 4*cross*-3D-coordinate, and/or using borders of the crosswalk 4*cross* as expressed in a known coordinate system such as the world geodetic system (WGS) used in cartography, geodesy, and satellite navigation including GPS, and/or using any other geometric location expression that maps the shape/boundaries of crosswalk 4*cross* into a reference coordinate system. From a functional perspective, 4*cross*-QSGFD may describe/classify 4*cross*-classification the respective crosswalk 4*cross*: e.g., identify 4*cross*-QSGFD as an area that is designated for pedestrians 3*ped* to cross the street 4*road*.

Any number of techniques may be used separately or in combinations to determine the geometry of a quasi-static object, including stereo vision from a single edge device 1*edge2*, RGB-Depth cameras from a single edge device, lidar sensors, and/or triangulation using two cameras on two adjacent edge devices: e.g., 1*edge2* and 1*edge3* may triangulate every geometric point of crosswalk 4*cross* that is visible to both. Additional more exotic techniques such as simultaneous localization and mapping (SLAM) may be used, in which a change in perspective is utilized to extract 3D information, wherein such a change in perspective may be achieved by considering visual inputs form several of the edge devices.

Any number of techniques may be used separately or in combinations to link a geometric description of a quasi-static object to a known coordinate system. One such technique is using a GPS receiver 1GNSS onboard an edge device 1*edge*, or another method, to determine a location thereof, and then extrapolating the position of various parts of quasi-static objects using range/angle information extracted by the edge device using range finding techniques such as lidar, depth sensors, and stereo vision. Another such technique is to optically match/correlate imagery associated with the quasi-static object, or with the surrounding thereof, with a known visual database that includes references to a known coordinate system.

Any number of techniques may be used separately or in combinations to determine a functional purpose/classification of a quasi-static object, including machine learning/neural-network models operative to automatically classify different objects in a process known as inference, using manual approaches for tagging objects, and/or accessing a geographic information system (GIS) that may already include a functional description of elements on a map. When using machine learning/neural-network models, the inference process may be executed on a purely visual input such as 4*cross-image/s*, or on an already processed input such as 4*cross*-QSGFD that includes 3D information. Inferencing using 3D inputs may be more accurate sometimes, or even require a lesser degree of processing power, as compared to direct visual inference, depending on the nature of the quasi-static object and optical conditions.

In one embodiment, the generation 1*generate4* of quasi-static geo-functional descriptions, such as the generation of 4*cross*-QSGFD, is done locally using a processor 1*CPU* onboard the edge device 1*edge* that is capturing the relevant sequences of imagery data 4*cross-image/s*. In such a case, the sequences of imagery data 4*cross-image/s* are aggregated and stored locally in the respective edge device for local machine learning/image processing.

In one embodiment, the generation 1*generate4* of quasi-static geo-functional descriptions, such as the generation of 4*cross*-QSGFD, is done externally in a server 1*server/s* that is in communicative contact with the edge device 1*edge* that is capturing the relevant sequences of imagery data 4*cross-image/s*. In such a case, the sequences of imagery data 4*cross-image/s* are sent over a communication network 1 network from the edge device to the server for machine learning/image processing.

In one embodiment, the generation 1*generate4* of quasi-static geo-functional descriptions, such as the generation of 4*cross*-QSGFD, is done cooperatively both locally using a processor 1*CPU* onboard the edge device 1*edge* that is capturing the relevant sequences of imagery data 4*cross-image/s* and externally in a server 1*server/s* that is in communicative contact with the edge device. In such a case, for example, the geometric/positioning aspects of generating the quasi-static geo-functional descriptions may be done locally in the edge device, while the functional description aspects of generating the quasi-static geo-functional descriptions may be done in the server after receiving pre-processed and/or post-processed data from the edge device.

Figure 2B:
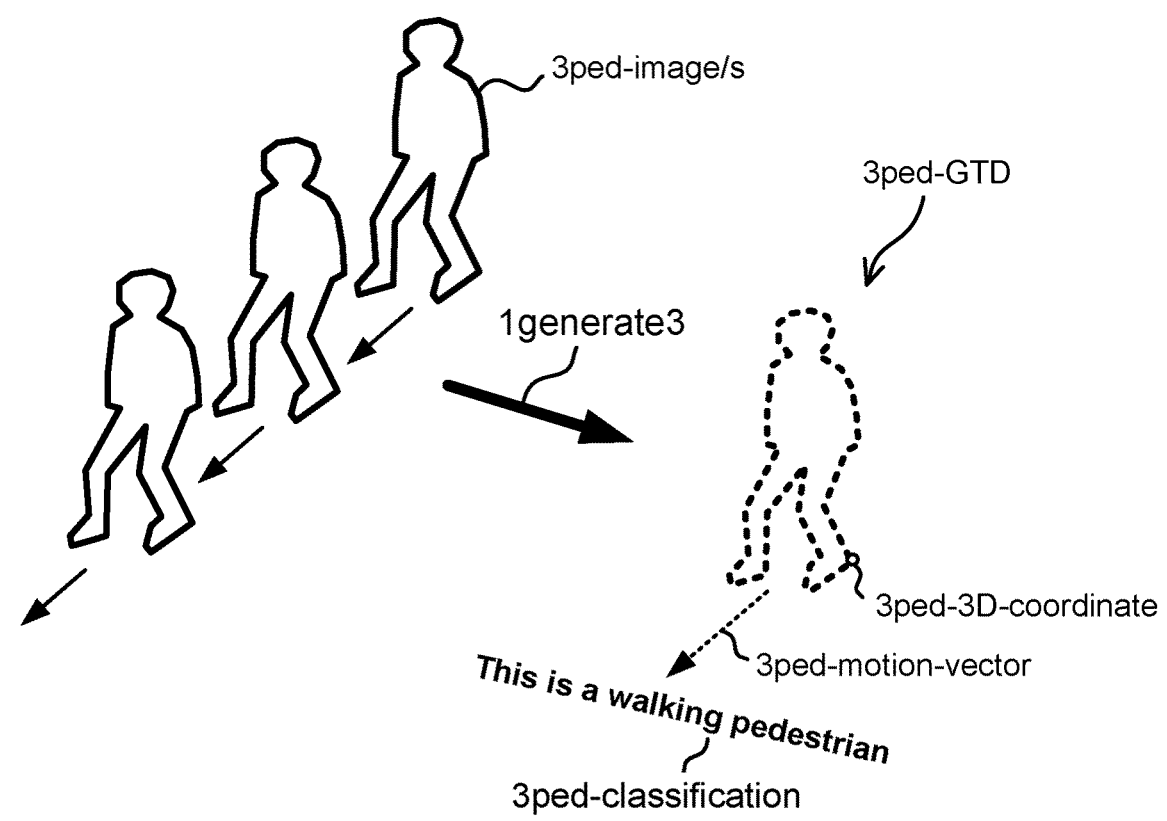
FIG. 2B illustrates one embodiment of a dynamic object imagery and a representation derived from the dynamic object imagery including motion vectors and semantic information.

FIG. 2B illustrates one embodiment of a dynamic object imagery and a representation derived from the dynamic object imagery including motion vectors and semantic information. The imagery 3*ped-image/s* was captured by one of the edge devices 1*edge* and is a depiction of pedestrian 3*ped*, which is a dynamic/moving object. Dynamic objects, by their nature, are on the move, and therefore imagery 3*ped-image/s* is a sequence of images taken by the edge device, from which, for example, motion vectors can be derived. During, immediately after, or sometime after capturing the sequences of a specific dynamic object imagery, e.g., the sequence 3*ped-image/s* depicting a moving pedestrian, the sequences are processed using image processing and/or machine-learning techniques in order to generate 1*generate3* a geo-temporal description 3*ped*-GTD of the specific object, which is a way to describe the dynamic object from both a geometric/temporal perspective and a functional perspective. For example, from a geometric/temporal perspective, 3*ped*-GTD may describe a geometrically chang-ing-location of the respective pedestrian 3*ped*: e.g., using a 3D representation of the pedestrian including 3D spatial coordinates 3*ped*-3D-coordinate, and/or using a motion vec-tor 3*ped*-motion-vector, and/or using any other dynamic geometric location expression that maps the shape/move-ment of pedestrian 3*ped* into a reference coordinate system. From a functional perspective, 3*ped*-GTD may describe/ classify 3*ped*-classification the respective pedestrian 3*ped*: e.g., identify 3*ped*-GTD as a walking human.

Any number of techniques may be used separately or in combinations to determine geometric movement of a dynamic objects, including stereo vision from a single edge device 1*edge*2, RGB-Depth cameras from a single edge device 1*edge*2, lidar sensors, and/or triangulation using two cameras on two adjacent edge devices: e.g., 1*edge*2 and 1*edge*3 may triangulate every geometric point of pedestrian 3*ped*, during its movement, that is visible to both.

Any number of techniques may be used separately or in combinations to link a geometric description of a dynamic object to a known coordinate system, in a similar fashion to linking geometric description of a quasi-static objects as described before, but with the difference of adapting location parameters to match movement vectors.

Any number of techniques may be used separately or in combinations to determine a functional purpose/classifica-tion of a dynamic object, including machine learning/neural-network models operative to automatically classify different objects. When using machine learning/neural-network mod-els, the inference process may be executed on a purely visual input such as 3*ped*-image/s, or on an already processed input such as 3*ped*-GTD that includes 3D information and motion vectors.

In one embodiment, the generation 1*generate*3 of geo-temporal descriptions, such as the generation of 3*ped*-GTD, is done locally using a processor 1*CPU* onboard the edge device 1*edge* that is capturing the relevant sequences of imagery data 3*ped*-image/s. In such a case, the sequences of imagery data 3*ped*-image/s are aggregated and stored locally in the respective edge device for local machine learning/ image processing.

In one embodiment, the generation 1*generate*3 of geo-temporal descriptions, such as the generation of 3*ped*-GTD, is done externally in a server 1*server/s* that is in communi-cative contact with the edge device 1*edge* that is capturing the relevant sequences of imagery data 3*ped*-image/s. In such a case, the sequences of imagery data 3*ped*-image/s are sent over a communication network 1*network* from the edge device to the server for machine learning/image processing.

In one embodiment, the generation 1*generate*3 of geo-temporal descriptions, such as the generation of 3*ped*-GTD, is done cooperatively both locally using a processor 1*CPU* onboard the edge device 1*edge* that is capturing the relevant sequences of imagery data 3*ped*-image/s and externally in a server 1*server/s* that is in communicative contact with the edge device. In such a case, for example, the geometric/ temporal aspects of generating the geo-temporal descrip-tions may be done locally in the edge device, while the functional description aspects of generating the geo-tempo-ral descriptions may be done in the server after receiving pre-processed and/or post-processed data from the edge device.

Figure 2C:
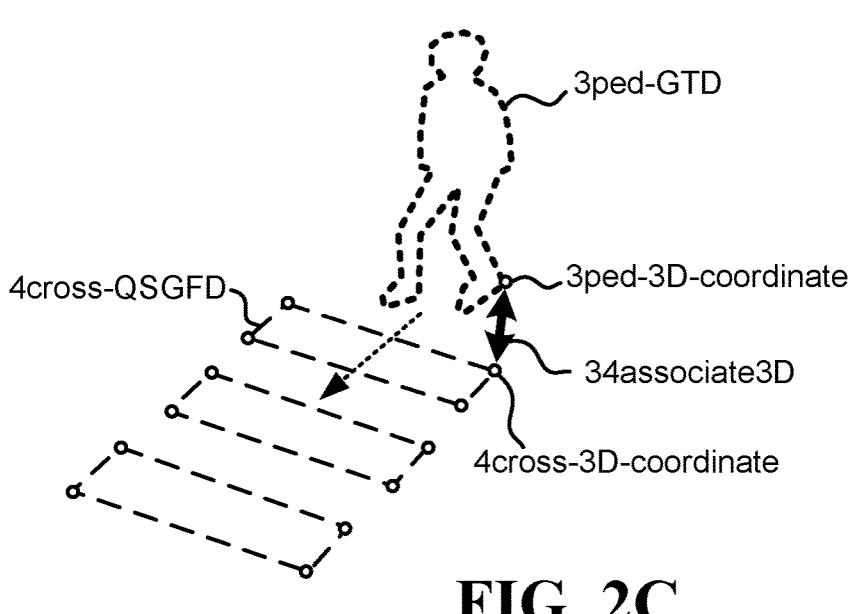
FIG. 2C illustrates one embodiment of an association made between the dynamic and quasi-static objects at the semantic and geometric level.

FIG. 2C illustrates one embodiment of an association made between the dynamic and quasi-static objects at the semantic and geometric level. After a quasi-static geo-functional description of a quasi-static object was con-structed, usually over long periods of image-capturing time, a real-time, near-real time, or post-real-time processing can be made to detect and classify events involving a dynamic object interacting with the quasi-static object. For example, after 4*cross*-QSGFD was generated from imagery captured over a period of more than one day, a description of a geometric location of the respective crosswalk 4*cross*, using a 3D representation of the crosswalk including 3D spatial coordinates 4*cross*-3D-coordinate, is now available. In addi-tion, a functional description/classification 4*cross*-classifi-cation of the respective crosswalk is also now available. Now, when a pedestrian 3*ped* decides to cross the street (FIG. 1A), during (real-time), immediately after (e.g., sev-eral seconds after), or sometime after (e.g., several minutes after) capturing a sequences showing the pedestrian cross-ing, e.g., the sequence 3*ped*-image/s, the sequences are processed to generate 1*generate*3 a geo-temporal descrip-tion 3*ped*-GTD of the pedestrian 3*ped* crossing, including a geometric/temporal description of geometrically changing-location of the respective pedestrian 3*ped*: e.g., using a 3D representation of the pedestrian including 3D spatial coor-dinates 3*ped*-3D-coordinate and using a motion vector 3*ped*-motion-vector, and including a description/classification 3*ped*-classification of the respective pedestrian 3*ped* as being a walking human. This recently-generated geo-tem-poral description 3*ped*-GTD is then compared/correlated 34*associate*3D with the previously-available quasi-static geo-functional description 4*cross*-QSGFD of the crosswalk 4*cross*, and a conclusion is made that an event of a pedes-trian 3*ped* crossing over a crosswalk 4*cross* in now happen-ing, has been happening, or has recently happened.

The comparison/correlation 34*associate*3D of recently-generated 3*ped*-GTD with the previously-available 4*cross*-QSGFD is made at two levels. The first level is a geo-spatial level, in which geo-spatial coordinates of the dynamic object are correlated with the geo-spatial coordinates of the quasi-static object. For example, the geo-spatial coordinates 3*ped*-3D-coordinate is correlated with the geo-spatial coordinates 4*cross*-3D-coordinate to determine physical proximity/con-tact between the pedestrian 3*ped* and the crosswalk 4*cross*. The second level is a semantic level, in which the type of the dynamic object is matched with the type of quasi-static object. For example, the classification 4*cross*-classification of 4*cross*-GSGFD as a "crosswalk" and the classification 3*ped*-classification of 3*ped*-GTD as a "human" are com-bined to reach the conclusion that pedestrian 3*ped* in cross-ing the street over crosswalk 4*cross*. It is noted that the two levels of comparison/correlation are necessary to conclude a "crossing event", as it is first necessary to conclude that the two objects are in close proximity, and to then conclude that the types of objects facilitate a crossing event.

In one embodiment, a detection of an interaction event, such as the "crossing event", may include various additional conclusions. For example, by further analyzing the geo-spatial information of the two objects, e.g., 3*ped*-3D-coor-dinate and 4*cross*-3D-coordinate, a conclusion can be made that the pedestrian 3*ped* is "missing" the markings of the crosswalk 4*cross*, and an appropriate action can be taken, e.g., announcing nearby vehicles 3*car* that a pedestrian is crossing in a dangerous manner.

In one embodiment, the detection and classification of events involving a dynamic object interacting with the quasi-static object is done in the edge devices 1*edge* using locally available computational capabilities 1*cpu*. In one embodiment, the detection and classification of events involving a dynamic object interacting with the quasi-static object is done in a remote server 1*server/s*. In such as case, the previously-available quasi-static geo-functional description, e.g., 4_cross_-QSGFD, is stored in the server 1_server/s_, the recently-generated geo-temporal description, e.g., 3_ped_-GTD, is sent in real-time, or near real-time, from the respective edge device 1_edge_ to the server 1_server/s_, and, for example, the comparison/correlation 34_associate_3D of recently-generated 3_ped_-GTD with the previously-available 4_cross_-QSGFD is done in the server 1_server/s_. Other distribution of processing tasks may be possible between the edge devices 1_edge_ and the server 1_server/s_.

One embodiment is a system operative to generate geo-temporal descriptions of dynamic objects and associate the geo-temporal descriptions with quasi-static geo-functional descriptions of quasi-static objects in a certain area, comprising: a plurality of edge devices 1_edge_ (FIG. 1A), each comprising at least one optical sensor 1_sens_ (FIG. 1B) operative to capture imagery data, in which the plurality of edge devices are located respectively at a plurality of different locations so as to result in at least partial visual coverage of the certain area 1_area_ (FIG. 1A); and a server 1_server/s_ (FIG. 1C) associated with the edge devices 1_edge_.

In one embodiment, the system is configured to: generate (e.g., 1_generate_4, FIG. 2A) the quasi-static geo-functional descriptions (e.g., 4_cross_-QSGFD, FIG. 2A) of at least some of the quasi-static objects 4_struc_, 4_road_, 4_sidewalk_, 4_cross_, 4_sign_, 4_tree_, 4_pole_, 4_cable_ (FIG. 1A) in the certain area 1_area_ using the imagery data (e.g., 4_cross_-image/s, FIG. 2A) captured by the edge devices 1_edge_ and accumulated over a certain period of time; further generate, in real time (e.g., 1_generate_3, FIG. 2B), the geo-temporal descriptions (e.g., 3_ped_-GTD, FIG. 2B) of at least some of the dynamic objects 3_car_, 3_ped_ (FIG. 1A) using current imagery data (e.g., 3_ped-image/s_, FIG. 2B) captured by the edge devices 1_edge_; and associate (e.g., 34_associate_3D, FIG. 2C) said geo-temporal descriptions with the geo-functional description, thereby establish geo-temporal interactions of the dynamic objects with the quasi static objects in the certain area.

In one embodiment, in conjunction with said generation of the quasi-static geo-functional description (e.g., 4_cross_-QSGFD), per each of at least some of the edge devices 1_edge_, the system is configured to: detect and at least partially classify the quasi-static objects 4_struc_, 4_road_, 4_sidewalk_, 4_cross_, 4_sign_, 4_tree_, 4_pole_, 4_cable_ that appear in the imagery data captured by the respective optical sensor 1_sens_, in which said classification reveals a functional purpose of the quasi-static objects; and estimate spatial positions (e.g., 4_cross_-3D-coordinate, FIG. 2A) of each of the quasi-static objects detected, in which said estimation is expressed using a data format comprising at least one of: (i) a 3D point cloud, (ii) vectors, and/or (iii) polygon mesh.

In one embodiment, said estimation of the spatial positions of the quasi-static objects detected (e.g., 4_cross_-3D-coordinate) is at least partially based on an estimated spatial position of the respective edge device (e.g., 1_edge_3) together with additional information associated with the respective imagery data (e.g., 4_cross-image/s_).

In one embodiment, the additional information comprises at least one of: (i) depth information of points in the quasi-static objects relative to the respective edge device, and/or (ii) angular information of points in the quasi-static objects relative to the respective edge device, in which the respective optical sensor/s (e.g., 1_sens_ of 1_edge_3) are of a type comprising at least one of: (i) a stereographic camera type, (ii) a RGB-Depth type, (iii) a single-camera type with machine-learning depth estimation, and/or (iv) a lidar type, and in which the estimation of the spatial position of the edge device (e.g., 1_edge_3) is done using a GNSS receiver (e.g., 1 GNSS of 1_edge_3), such as a GPS receiver, co-located with the edge device.

In one embodiment, said estimation of the spatial positions of the quasi-static objects detected (e.g., 4_cross_-3D-coordinate) is at least partially based on correlating the captured imagery data of the quasi-static objects (e.g., 4_cross-image/s_) with appearances of the quasi-static objects in a geo-spatially tagged imagery data of an external source, in which said external source comprises at least one of: (i) satellite imagery, (ii) imagery captured by airborne platforms, and/or (iii) imagery captured by on-road mobile platforms such as vehicles.

In one embodiment, at least one of the quasi-static objects is at least a portion of a road 4_road_, and the geo-functional description of said portion of the road comprises: at least spatial locations of a set of borders defining said portion of the road; and an identification of the portion of the road as being a road and functional for supporting vehicular traffic and pedestrian movement.

In one embodiment, at least one of the quasi-static objects is at least a portion of a sidewalk 4_sidewalk_, and the geo-functional description of said portion of the sidewalk comprises: at least spatial locations of a set of borders defining said portion of the sidewalk; and an identification of the portion of the sidewalk as being a sidewalk and functional for supporting pedestrian movement.

In one embodiment, at least one of the quasi-static objects is a crosswalk markings 4_cross_ on a road 4_road_, and the geo-functional description 4_cross_-QSGFD of said crosswalk markings comprises: at least spatial locations of a set of borders defining said crosswalk markings 4_cross_-3D-coordinate; and an identification of the crosswalk markings 4_cross_ as being a crosswalk and functional for supporting pedestrians crossing a road.

In one embodiment, at least one of the quasi-static objects is a pole 4_pole_ and related structures associated with at least one of: (i) a traffic light, (ii) a traffic sign 4_sign_, (iii) street illumination, and/or (iv) power lines and/or telephone cables 4_cable_, and the geo-functional description of said pole comprises: at least spatial locations of a vertical construct defining said pole; and an identification of the pole as being of a certain functional type.

In one embodiment, at least one of the quasi-static objects is a structure 4_struc_ associated with at least one of: (i) a building, and/or (ii) a utility device, and the geo-functional description of said structure comprises: at least a three-dimensional representation of a border defining the structure; and an identification of the structure as being of a certain functional type.

In one embodiment, per each of at least some of the imagery data captured by the edge devices (e.g., 4_cross-image/s_), the system is further configured to detect, over said certain period of time, multiple substantially unchanged appearances of the quasi-static objects (e.g., 4_cross_), thereby ascertaining a quasi-static nature of the objects, in which said certain period of time is at least long enough to substantially eliminate temporary visual obstructions created by at least some of the dynamic objects 3_car_, 3_ped_.

In one embodiment, as part of said generation of the quasi-static geo-functional description (e.g., 4_cross_-QSGFD), each of at least some of the edge devices (e.g., 1_edge_3) is configured to generate, using a respective embedded computer (e.g., 1_cpu_ of 1_edge_3, FIG. 1B), a three-dimensional geo-description of the respective quasi-static objects detected (e.g., 4_cross_-3D-coordinate), in which said three-dimensional geo-description comprises at least one of:

(i) a 3D point cloud, (ii) vectors, and/or (iii) polygon mesh, and further comprises the respective estimated spatial positions; the edge devices 1*edge* are communicatively interconnected to the server 1*server/s* via a wireless mesh network 1*network* (FIG. 1C) having a finite bandwidth; each of at least some of the edge 1*edge* devices is further configured to send the respective three-dimensional geo-descriptions via the wireless mesh network to the server; and the server is configured to receive and combine the three-dimensional geo-descriptions from the edge devices, thereby facilitating said generation of the quasi-static geo-functional description of the certain area; in which a locally captured and stored instance of the imagery data (e.g., 4*cross-image/s*), which is used by the edge devices to locally generate the three-dimensional geo-descriptions of the quasi-static objects, is at least one-thousand times larger than a size of the respective three-dimensional geo-descriptions generated locally (e.g., 4*cross*-3D-coordinate), thereby further facilitating said generation of the quasi-static geo-functional description of the certain area by the server without congesting the wireless mesh network.

In one embodiment, in conjunction with said further generation of the geo-temporal descriptions (e.g., 3*ped*-GTD) of at least some of the dynamic objects (e.g., 3*ped*), each of at least some of the edge devices 1*edge* is configured to: detect and at least partially classify in real time, using a machine-learning-enabled computer 1*cpu* embedded in the edge device, dynamic objects that appear in the imagery data (e.g., 3*ped-image/s*) captured in real time by the respective optical sensor 1*sens*, in which said classification identifies the dynamic object as being at least one of: (i) a vehicle 3*car*, (ii) a pedestrian 3*ped*, and/or (iii) a flying natural or artificial object; and estimate at least one of: (i) spatial positions of each of the dynamic objects detected (e.g., 3*ped*-3D-coordinate, FIG. 2B), and/or (ii) movement vectors (e.g., 3*ped-motion-vector*, FIG. 2B) associated with the dynamic objects detected.

In one embodiment, said estimation of the spatial positions and/or movement vectors of the dynamic objects detected is at least partially based on an estimated spatial position of the respective edge device 1*edge* together with additional information associated with the respective imagery data, in which the additional information comprises at least one of: (i) depth information of points in the dynamic objects relative to the respective edge device, and/or (ii) angular information of points in the dynamic objects relative to the respective edge device, in which the respective optical sensor/s 1*sens* are of a type comprising at least one of: (i) a stereographic camera type, (ii) a RGB-Depth type, (iii) a single-camera type with machine-learning depth estimation, and/or (iv) a lidar type, and in which the estimation of the spatial position of the edge device is done using a GNSS receiver 1GNSS, such as a GPS receiver, co-located with the edge device.

In one embodiment, one of the edge devices 1*edge*2 that has just detected and classified one of the dynamic objects 3*car* is further configured to: characterize the dynamic object so as to allow further identification of that specific dynamic object by other edge devices; and send the characterization data over a communication interface 1*comm* (FIG. 1B), 1*network* to at least an adjacent edge device 1*edge*3; in which the adjacent edge device is configured to receive and use said characterization data to identify the specific dynamic object 3*car* when it enters a visual coverage area of the adjacent edge device, thereby tracking movement of the specific dynamic object across at least two edge devices 1*edge*2, 1*edge*3, and in which the characterization data comprises at least one of: (i) colors, (ii) shapes, (iii) movement behavior, (iv) a machine learning model, and/or (v) facial markers.

In one embodiment, said communication interface 1*comm*, 1*network* is a bandwidth-limited wireless mesh interconnecting the edge devices 1*edge*, and therefore said characterization data comprises less than one-hundred kilobytes in order to avoid congesting the wireless mesh.

In one embodiment, in conjunction with said association 34*associate*3D of the geo-temporal descriptions with the geo-functional description, per each of at least some of the edge devices and associated imagery data, the system is configured to: estimate spatial positions of each of the dynamic objects detected; compare said spatial positions of each of the dynamic objects detected (e.g., 3*ped*-3D-coordinate) to spatial positions of each of the quasi-static objects detected (e.g., 4*cross*-3D-coordinate); and conclude, based on said comparison, that a certain dynamic object is currently interacting with a certain quasi-static object.

In one embodiment, one of the quasi-static objects is a crosswalk 4*cross*; one of the dynamic objects is a pedestrian 3*ped*; and said conclusion is that the pedestrian is crossing a road over the crosswalk.

In one embodiment, one of the quasi-static objects is a sidewalk 4*sidewalk* and/or a road 4*road* with no parking markings; one of the dynamic objects is an on-road vehicle 3*car*; and said conclusion is that the on-road vehicle has just parked in a non-parking area.

In one embodiment, one of the quasi-static objects is a shop 4*struc*; one of the dynamic objects is a pedestrian 3*ped*; and said conclusion is that the pedestrian has just entered the shop.

In one embodiment, said visual coverage of the certain area 1*area* is partial, thereby resulting in coverage gaps, in which at least one of the quasi-static objects extends from one coverage zone of a first edge device into a coverage gap and then into a coverage zone of a second edge device, thereby resulting in a partial geo-functional description of that quasi-static object; and the system is further configured to extrapolate the partial geo-functional description by using machine learning techniques to fill gaps in the partial geo-functional description, thereby assisting in generating a complete geo-functional description of the certain area.

In one embodiment, said one of the quasi-static objects is a road 4*road*; the plurality of edge devices 1*edge*1, 1*edge*2 are placed in a sequence on poles along the road; and said extrapolation of the partial geo-functional description is operative to fill gaps in the geo-functional description of the road, thereby resulting in a complete and continuous geo-functional description of the road.

In one embodiment, said visual coverage of the certain area 1*area* is at least partially overlapping, thereby resulting in visual coverage of at least a portion of one of the quasi-static object (e.g., 4*road*) by at least two different edge devices 1*edge*1, 1*edge*2, thereby resulting in a better geo-functional description of that portion of the quasi-static object achieved at least in part by correlating imagery data from the at least two different edge devices and/or achieved at least in part by using triangulation techniques.

In one embodiment, the certain area 1*area* comprises at least one of: (i) an outdoor area comprising streets 4*road*, and/or (ii) an indoor area.

Figure 3:
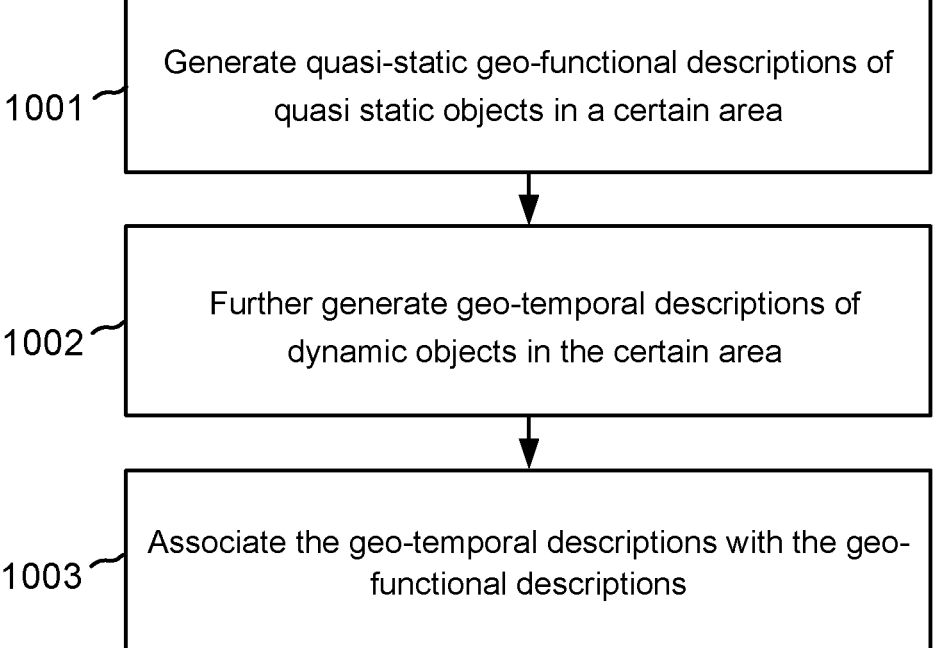
FIG. 3 illustrates one embodiment of a method for generating geo-temporal descriptions of dynamic objects and associating the geo-temporal descriptions with quasi-static geo-functional descriptions of quasi-static objects in a certain area.

FIG. 3 illustrates one embodiment of a method for generating geo-temporal descriptions of dynamic objects and associating the geo-temporal descriptions with quasi-static geo-functional descriptions of quasi-static objects in a certain area.

The method includes: in step 1001, generating (e.g., 1*generate*4, FIG. 2A), by a plurality of edge devices in the certain area and a server, quasi-static geo-functional descriptions (e.g., 4*cross*-QSGFD, FIG. 2A) of at least some of the quasi-static objects 4*struc*, 4*road*, 4*sidewalk*, 4*cross*, 4*sign*, 4*tree*, 4*pole*, 4*cable* (FIG. 1A) in the certain area 1*area* using imagery data (e.g., 4*cross-image/s*, FIG. 2A) captured by the edge devices 1*edge* and accumulated over a certain period of time. In step 1002, further generating, in real time (e.g., 1*generate*3, FIG. 2B), geo-temporal descriptions (e.g., 3*ped*-GTD, FIG. 2B) of at least some of dynamic objects 3*car*, 3*ped* (FIG. 1A) in the area using current imagery data (e.g., 3*ped-image/s*, FIG. 2B) captured by the edge devices 1*edge*. In step 1003, associating (e.g., 34*associate*3D, FIG. 2C) said geo-temporal descriptions with the geo-functional description, thereby establishing geo-temporal interactions of the dynamic objects with the quasi-static objects in the certain area.

Figure 4A:
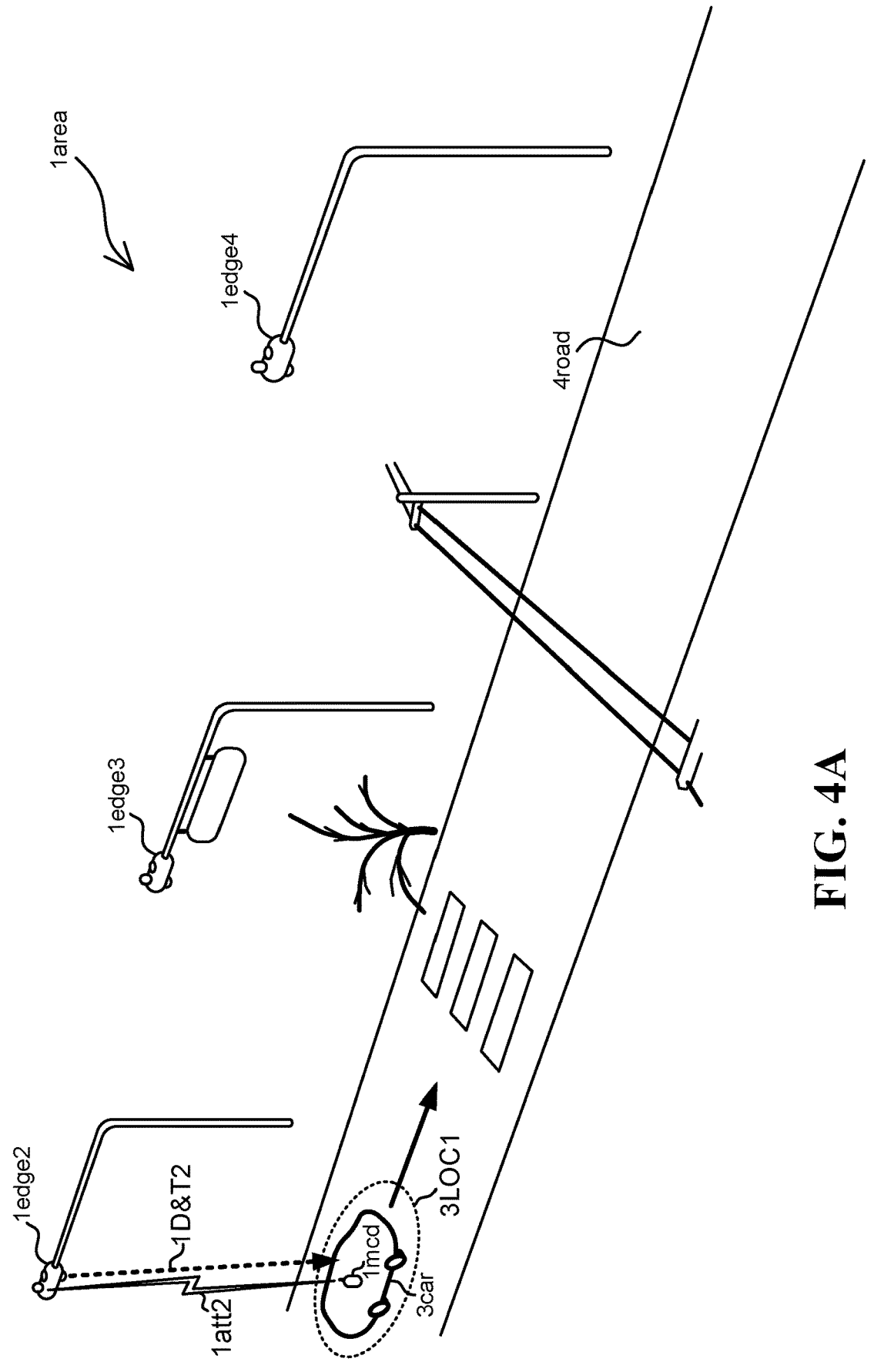
FIG. 4A illustrates one embodiment of a mobile device that is currently attached to one of a series of base stations and that is located in a moving vehicle that is being visually tracked along a path of progression.

FIG. 4A illustrates one embodiment of a mobile device 1*mcd* that is currently attached to one 1*edge*2 of a series of base stations 1*edge* and that is located in a moving vehicle 3*car* that is being visually tracked 1D&T2 along a path of progression, e.g., along 4*road*. The mobile device 1*mcd* communicates with the outside world via base station 1*edge*2 that is one base station is a series of base stations 1*edge* belonging to a certain radio access network (RAN). The mobile device 1 *mcd* needs to stay in a continuous communication with the outside world, e.g., maintain an undisrupted voice call, as 3*car* moves along 4*road* and switches between the different base stations on its way. In order to assist with a scenario in which frequent switching between the various base stations 1*edge* is required, e.g., when the distance between base stations is short, and/or when the vehicle travels fast, the RAN first tries to determine an exact location 3LOC1 of mobile device 1*mcd*. Determining an exact location 3LOC1 of 1*mcd* can be done in several ways, e.g., by asking 1*mcd* to use its onboard global navigation satellite system (GNSS) receiver to report current position to the RAN. After the exact location 3LOC1 of 1*mcd* is determined, the RAN tries to visually locate a moving object associated with 1*mcd*. For example, the RAN may use an array of cameras located along 4*road* to try and "look" at location 3LOC1 and detect a moving object. If the RAN "sees" that there is a moving car 3*car* in location 3LOC1, then it is highly probable that 1*mcd* is in the moving car. Now, when the RAN knows that 1*mcd* is in 3*car*, it can try to visually track 1D&T2, using the array of cameras, the moving object 3*car* along its path of progression, and consequently know the exact location of 1*mcd* at every point in time along said path of progression, in which such knowledge will be used next to assist with predicting a good location for performing a handover between the current base station 1*edge*2 to which 1*mcd* is currently attached and an adjacent base station 1*edge*3.

Figure 4B:
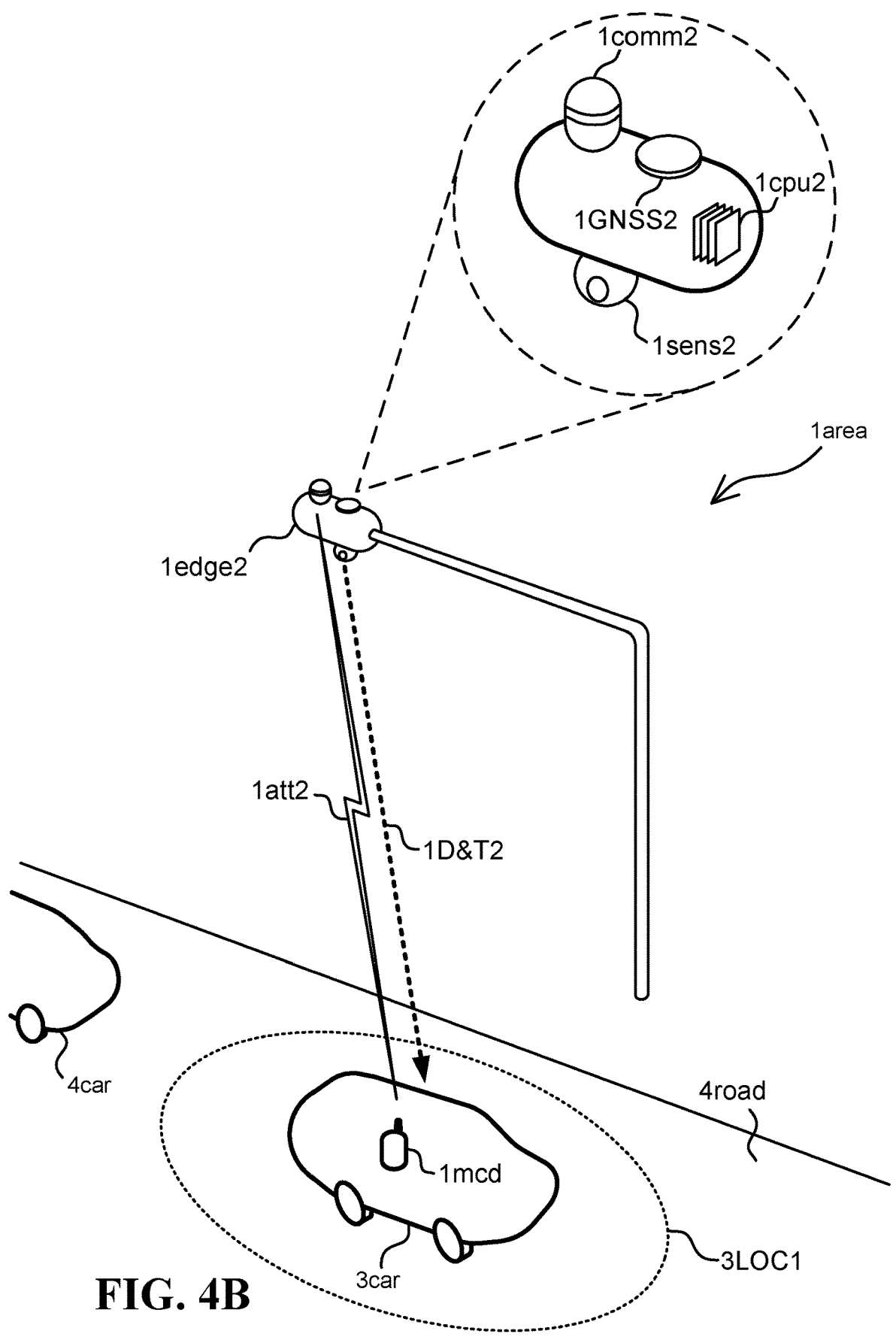
FIG. 4B illustrates one embodiment of a base station associated with a visual sensor that is being used to visually track the vehicle containing the mobile device currently attached to the base station.

FIG. 4B illustrates one embodiment of the base station 1*edge*2 associated with a visual sensor 1*sens* 2 that is being used to visually track 1D&T2 the vehicle 3*car* containing the mobile device 1*mcd* currently attached 1*att*2 to the base station 1*edge*2. Various other elements associated with the base station 1*edge*2 are shown, including a processor 1*cpu*2 that may assist with said tracking 1D&T2, a GNSS receiver 1GNSS2 that may assist in locating the base station 1*edge*2 relative to the vehicle 3*car*, and a communication element 1*comm*2 that is associated with RAN and backhaul functionality. A second vehicle 4*car* is shown as well, in which the accuracy of locating 3LOC1 the vehicle 3*car* is good enough to eliminate a possibility of erroneously assuming that 1*mcd* is located in 4*car*, and thereby eliminating a possibility of erroneously tracking 4*car* instead of tracking 1D&T2 the correct vehicle 3*car*.

Figure 4C:
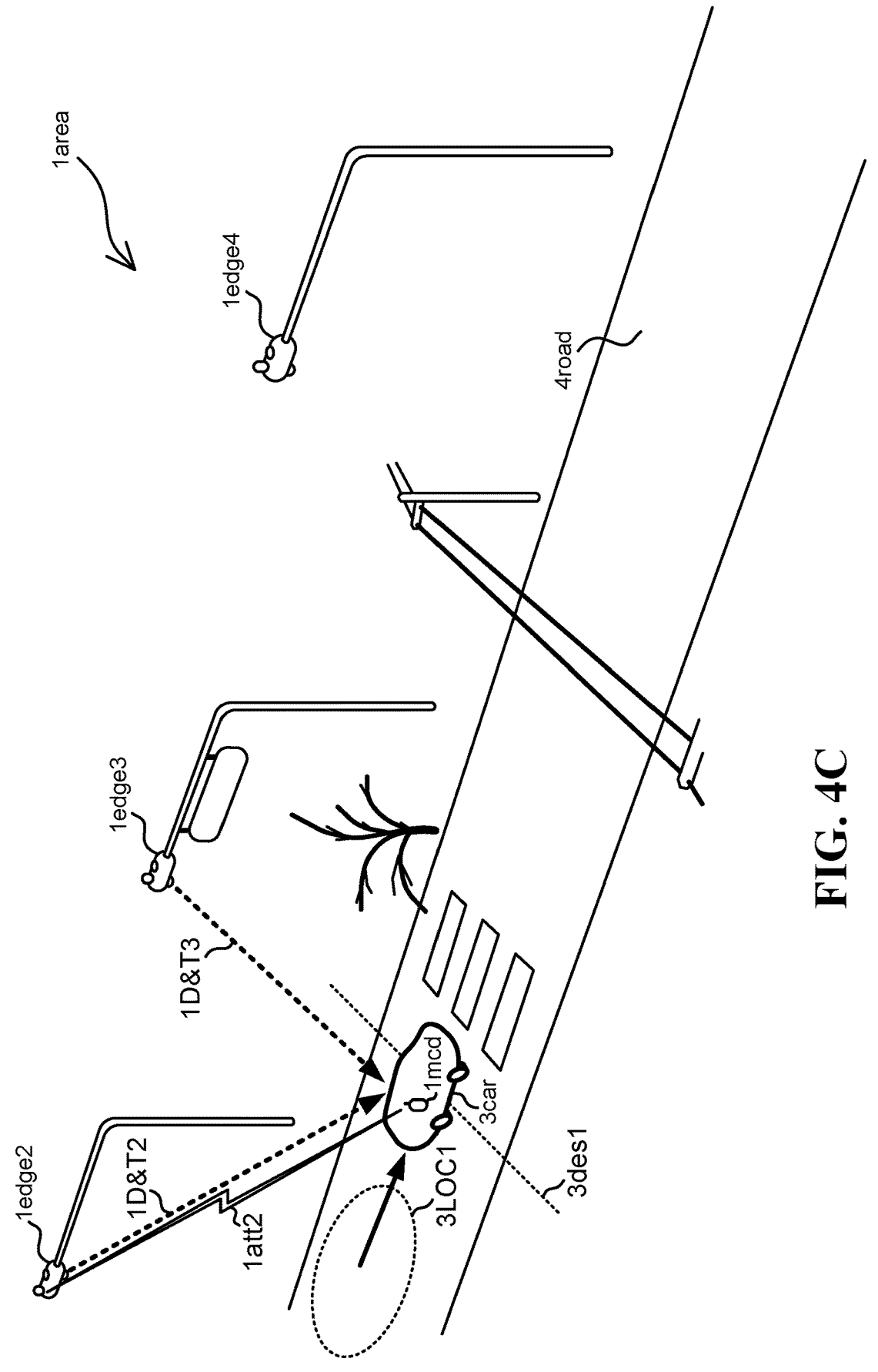
FIG. 4C illustrates one embodiment of the moving vehicle that has been visually tracked to a specific location that is known to be a good location for initiating a handover from the base station to which the mobile device is currently attached to an adjacent base station.

FIG. 4C illustrates one embodiment of the moving vehicle 3*car* that has been visually tracked 1D&T2 to a specific location 3*des*1 that is known to be a good location for initiating a handover from the base station 1*edge*2 to which the mobile device 1*mcd* is currently attached 1*att*2 to an adjacent base station 1*edge*3.

Figure 4D:
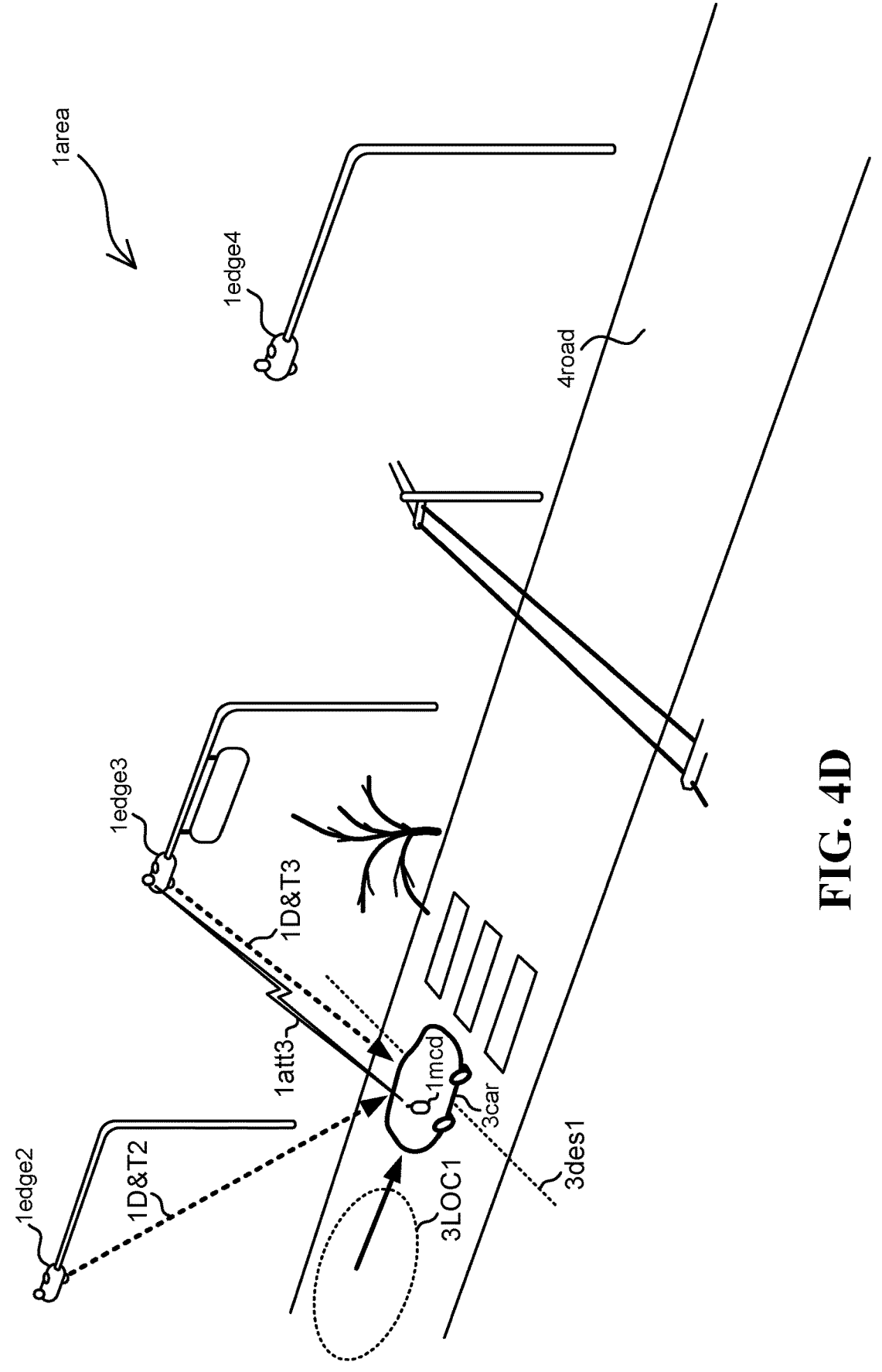
FIG. 4D illustrates one embodiment of handing over of the mobile device from one of the base stations to an adjacent base station while continuing with visually tracking the vehicle.

FIG. 4D illustrates one embodiment of handing over of the mobile device 1*mcd* from one of the base stations 1*edge*2 to an adjacent base station 1*edge*3 while continuing with visually tracking 1D&T3 the vehicle 3*car*. It is noted that continuing with visually tracking 3*car* may be done using visual sensors onboard 1*edge*2, e.g., 1D&T2, or using visual sensors onboard 1*edge*3, e.g., 1D&T3, or using both sensors and/or other sensors. It is noted that visually tracking 3*car* may be "handed over" from 1*edge*2 to 1*edge* 3, e.g., the transition from 1D&T2 to 1D&T3, at the same time as the RAN handover is performed, e.g., at the same time of the transition from 1*att*2 to 1*att*3.

Figure 4E:
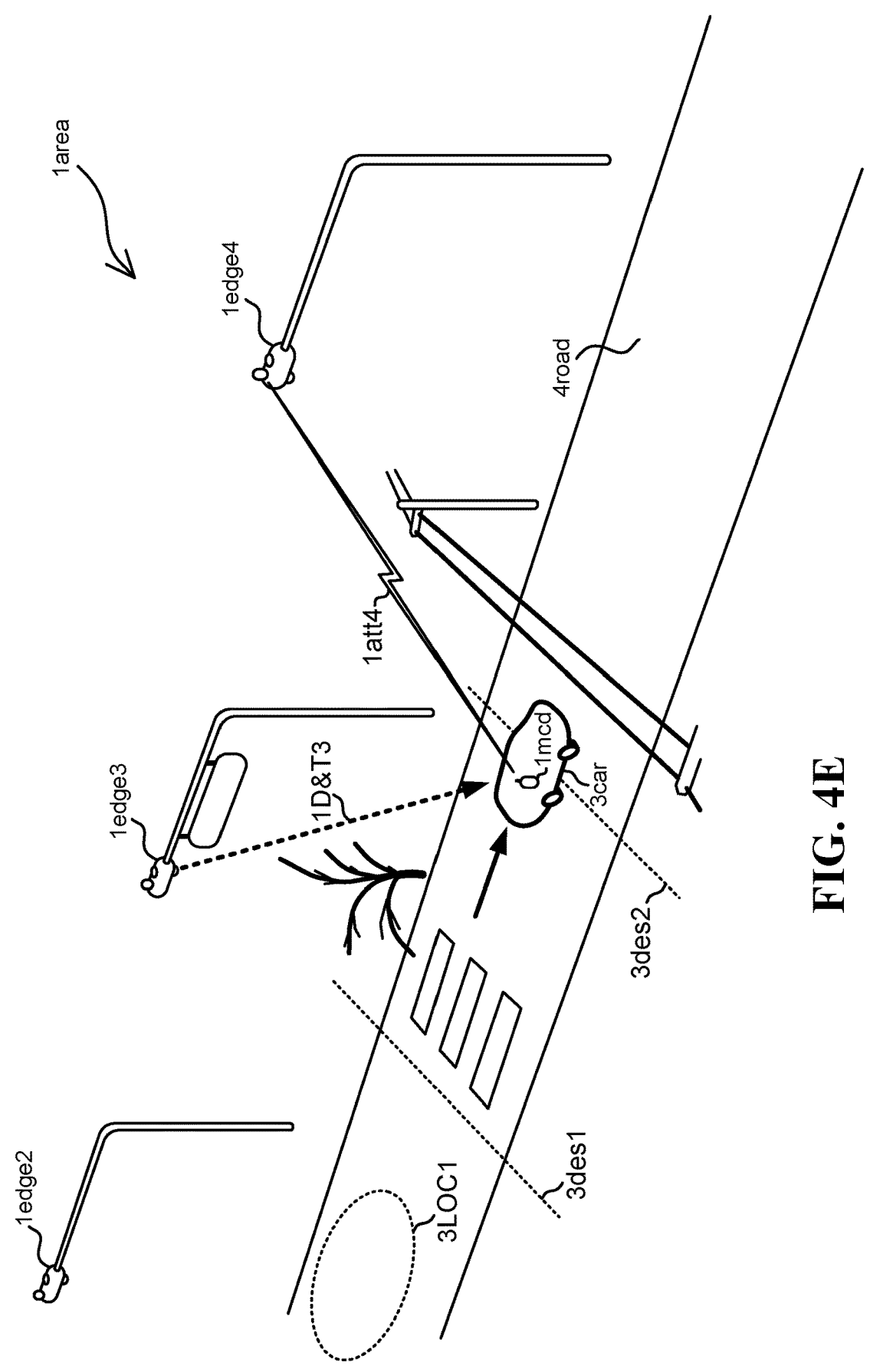
FIG. 4E illustrates one embodiment of the vehicle visually tracked to another location that is known to be a good location for initiating another handover to the next base station in the series.

FIG. 4E illustrates one embodiment of the vehicle 3*car* visually tracked 1D&T3 to another location 3*des*2 that is known to be a good location for initiating another handover to the next base station 1*edge*4 in the series. After performing said another handover, e.g., after the transition from 1*att*3 to 1*att*4, the mobile device 1*mcd* is attached 1*att*4 to base station 1*edge*4, and the RAN may continue with visually tracking 3*car*1.

One embodiment is a system operative to utilize visual cues to predict handover events in conjunction with radio-access-networks, comprising: a plurality of network-enabled optical sensors 1*sens* (FIG. 1B) distributed across a certain geographical area 1*area* (FIG. 4) so as to facilitate visual coverage thereof, e.g., the sensor 1*sens* 2 (FIG. 4B) belonging to base station 1*edge*2 (FIG. 4B) and similar sensors belonging to other base stations 1*edge*3, 1*edge*4 (FIG. 4A); and a first network-enabled computer 1*server/s* (FIG. 1C) communicatively connected to the visual sensors 1*sens*, in which the computer is operative to receive visual information from the optical sensors; and a second network-enabled computer 1*server/s*, which may be the same computer as the first computer or a different computer, communicatively connected to the first computer and operative to maintain communicative contact with various mobile client devices 1*mcd* (FIG. 4) currently attached to various base station nodes 1*edge* of a radio-access-network.

In one embodiment, the system is configured to: receive, in the second network-enabled computer 1*server/s*, via the radio-access-network, information regarding a current location 3LOC1 (FIG. 4A) of a specific one 1*mcd* of said mobile client devices currently on the move and currently attached 1*att*2 (FIG. 4A) to a particular one of the base station nodes 1*edge*2; process, in the first network-enabled computer 1*server/s* and in conjunction with said information regarding the current location 3LOC1 of the specific mobile client device 1*mcd*, the visual information received, and consequently visually detect and track 1D&T2 (FIG. 4A, FIG. 4B, FIG. 4C) movement associate with said specific mobile client device 1*mcd* that is on the move; and predict, using said visual tracking 1D&T2, and using at least one criterion, an exact time to initiate a handover operative to detach the specific mobile client device 1*mcd* from the particular base station node 1*edge*2 and to attach 1*att*3 (FIG. 4D) the specific mobile client device to a different one of the base station nodes 1*edge*3 (FIG. 4D).

In one embodiment, the system is further configured to: determine that said exact time has arrived; and initiate a handover, in conjunction with said exact time, thereby detaching the specific mobile client device 1*mcd* from the particular base station node 1*edge2* and attaching 1*att3* the specific mobile client device to the different one of the base station nodes 1*edge3*.

In one embodiment, as part of said visual detection 1D&T2, the system is configured to: use said information regarding the current location 3LOC1 of the specific mobile client device 1*mcd* to locate, in said visual information, a specific region in the span of visual information, that corresponds to said current location 3LOC1 of the specific mobile client device; detect, in said specific region located, a moving object, e.g., 3*car* (FIG. 4A); and assume that said moving object 3*car* detected is associated with the specific mobile client device 1*mcd* in conjunction with said visual tracking 1D&T2.

In one embodiment, as part of said visual tracking 1D&T2, the system is configured to track, using the visual information, said moving object 3*car* detected and assumed to be associated with the specific mobile client device 1*mcd*, across regions 4*road* (FIG. 4) in the span of visual information, until reaching a designated region 3*des*1 (FIG. 4C, FIG. 4D) that is associated with initiating the handover.

In one embodiment, said exact time is a time in which said moving object 3*car* detected, and assumed to be associated with the specific mobile client device 1*mcd*, has finally reached, and/or is about to reach, the designated region 3*des*1 that is associated with initiating the handover.

In one embodiment, said designated region 3*des*1, within the span of the visual information, is a region corresponding to a physical location that was previously determined to be an optimal location for performing said handover.

In one embodiment, said previous determination is based on at least one of: (i) trial an error done in conjunction with previous handovers, (ii) an analytical calculation based on wave propagation, and/or (iii) previously received signal strength indicator (RSSI) and/or reference signal received power (RSRP) measurements done in conjunction with the respective base station nodes 1*edge2*, 1*edge3*.

In one embodiment, the specific mobile client device 1*mcd* comprises at least one of: (i) a mobile client device within a vehicle 3*car* on the move and/or (ii) a mobile client device carried by a pedestrian on the move.

In one embodiment, at least some of the various base station nodes 1*edge2*, 1*edge3*, 1*edge3* (FIG. 4) are arranged as a sequence of nodes having an average spacing of less than 100 (one hundred) meters between adjacent ones of the nodes, in which the particular one of the base station nodes 1*edge2* and the different one of the base station nodes 1*edge3*, that are involved in said handover, are both two adjacent nodes in said sequence; the sequence of nodes is deployed alongside a road 4*road*; and the specific mobile client device 1*mcd* is located within the vehicle 3*car* traveling along the road 4*road*; in which the vehicle 3*car* is traveling at an average velocity that requires performing a sequence of handovers every less than 10 (ten) seconds, in which said handover is one of the sequence of handovers, and therefore the usage of said visual cues is critical to avoid interruptions in communication associated with said specific mobile client device 1*mcd*.

In one embodiment, at least some of the visual sensors 1*sens* are co-located, as a sequence, respectively with the sequence of base station nodes 1*edge*.

In one embodiment, at least some of the base station nodes 1*edge* are co-located with city-level infrastructure comprising at least one of: (i) lighting pole, (ii) traffic pole, and/or (iii) rooftops.

In one embodiment, at least some of the base station nodes 1*edge* are pico-cells, in which the pico-cells communicate with each other and/or with the two network-enabled computers 1*server/s* using a mesh communication topology.

In one embodiment, said information, regarding the current location 3LOC1 of the specific mobile client device 1*mcd*, is received, and then said prediction is made multiple times in conjunction with said sequence of handovers, before receiving another information regarding a new location of the specific mobile client device.

In one embodiment, said information regarding the current location LOC1 of the specific mobile client device 1*mcd*, received in the second network-enabled computer 1*server/s*, via the radio-access-network, comprises global navigation satellite system (GNSS) reading/s conveyed by the specific mobile client device.

In one embodiment, said information regarding the current location 3LOC1 of the specific mobile client device 1*mcd*, received in the second network-enabled computer 1*server/s*, via the radio-access-network, comprises triangulation of a position of the specific mobile client devices using radio-access-network timing measurements done in conjunction with the particular one of the base station nodes 1*edge2* and the different one of the base station nodes 1*edge3*, that are involved in said handover.

In one embodiment, said radio-access-network is associated with at least one of: (i) 3G/4G/5G/6G cellular infrastructure, (ii) long-term-evolution (LTE) cellular infrastructure, and/or (iii) WiFi communication infrastructure.

In one embodiment, said specific mobile client device 1*mcd* comprise at least one of: (i) a smartphone, (ii) a laptop, and/or (iii) a communication device embedded in a vehicle 3*car*.

Figure 5:
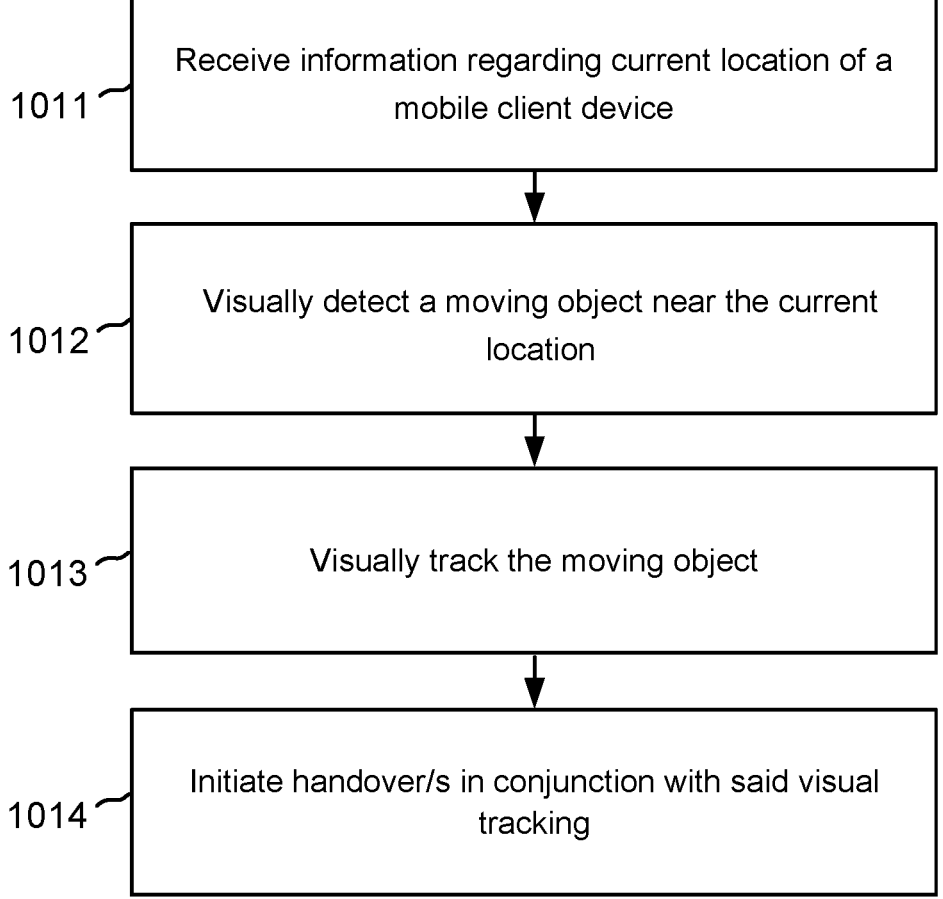
FIG. 5 illustrates one embodiment of a method for utilizing visual cues to predict handover events in conjunction with radio-access-networks.

FIG. 5 illustrates one embodiment of a method for utilizing visual cues to predict handover events in conjunction with radio-access-networks.

In step 1011, receiving, in conjunction with a radio-access network associated with a sequence of base station nodes located along a certain path, e.g., nodes 1*edge2*, 1*edge3*, 1*edge4* located along 4*road*, information regarding a current location 3LOC1 of a mobile client device 1*mcd* currently on the move along said path and currently attached to one of the base station nodes 1*edge2*.

In step 1012, detecting, using a sequence of visual sensors 1*sens* located along said path, a moving object, e.g., 3*car*, that is within no more than 10 (ten) meters from said current location 3LOC1, while assuming that the mobile client device 1*mcd* is in and/or with the moving object detected.

In step 1013, tracking, using the sequence of visual sensors 1*sens*, the moving object 3*car* along said path; and In step 1014, initiating a sequence of handover events, in which each of the handover events is initiated when the moving object 3*car* has been tracked to arrive at one of a list of locations 3*des*1, 3*des*2 (FIG. 4E) along the path that are designated as handover locations.

In one embodiment, each of the handover locations 3*des* is a location between two of the base station nodes 1*edge* that are adjacent, e.g., 3*des*1 is located between 1*edge2* and 1*edge3*, and 3*des* 2 is located between 1*edge3* and 1*edge4*, and that was previously determined to be an optimal location for performing a handover in conjunction with the respective two of the base station nodes.

In one embodiment, said moving object 3car requires a sequence of at least 10 (ten) handovers over a period of less than 100 (one hundred) seconds.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases.

Accordingly, unless specifically indicated herein, the order and grouping of the steps is not a limitation of the embodiments/cases.

Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor, but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A system operative to utilize visual cues to predict handover events in conjunction with radio-access networks, comprising:
   a plurality of network-enabled optical sensors distributed across a certain geographical area so as to facilitate visual coverage thereof;
   a first network-enabled computer communicatively connected to the visual sensors, in which the first network-enabled computer is operative to receive visual information from the optical sensors; and
   a second network-enabled computer communicatively connected to the first network-enabled computer and operative to maintain communicative contact with various mobile client devices currently attached to various base station nodes of a radio-access network;
wherein the system is configured to:
   receive, in the second network-enabled computer, via the radio-access network, information regarding a current location of a specific one of said mobile client devices currently on the move and currently attached to a particular one of the base station nodes;
   process, in the first network-enabled computer and in conjunction with said information regarding the current location of the specific mobile client device, the visual information received, and consequently visually detect and track movement associated with said specific mobile client device that is on the move; and
   predict, using said visual tracking, and using at least one criterion, an exact time to initiate a handover operative to detach the specific mobile client device from the particular base station node and to attach the specific mobile client device to a different one of the base station nodes,
wherein:
   the specific mobile client device comprises at least one of: (i) a mobile client device within a vehicle on the move and/or (ii) a mobile client device carried by a pedestrian on the move;
   at least some of the various base station nodes are arranged as a sequence of nodes having an average spacing of less than 100 (one hundred) meters between adjacent ones of the nodes, in which the particular one of the base station nodes and the different one of the base station nodes, that are involved in said handover, are both two adjacent nodes in said sequence;
   the sequence of nodes is deployed alongside a road; and
   the specific mobile client device is located within the vehicle traveling along the road;
   in which the vehicle is traveling at an average velocity that requires performing a sequence of handovers every less than 10 (ten) seconds, in which said handover is one of the sequence of handovers, and therefore the usage of said visual cues is critical to avoid interruptions in communication associated with said specific mobile client device.

2. The system of claim 1, wherein the system is further configured to:
   determine that said exact time has arrived; and
   initiate said handover, in conjunction with said exact time, thereby detaching the specific mobile client device from the particular base station node and attaching the specific mobile client device to the different one of the base station nodes.

3. The system of claim 2, wherein as part of said visual detection, the system is configured to:
   use said information regarding the current location of the specific mobile client device, to locate, in said visual information, a specific region in a span of visual information, that corresponds to said current location of the specific mobile client device;
   detect, in said specific region located, a moving object; and assume that said moving object detected is associated with the specific mobile client device in conjunction with said visual tracking.

4. The system of claim 3, wherein as part of said visual tracking, the system is configured to track, using the visual information, said moving object detected and assumed to be associated with the specific mobile client device, across regions in the span of visual information, until reaching a designated region that is associated with initiating the handover.

5. The system of claim 4, wherein said exact time is a time in which said moving object detected, and assumed to be associated with the specific mobile client device, has finally reached, and/or is about to reach, the designated region that is associated with initiating the handover.

6. The system of claim 4, wherein said designated region, within the span of the visual information, is a region corresponding to a physical location that was previously determined to be an optimal location for performing said handover.

7. The system of claim 6, wherein said previous determination is based on at least one of: (i) trial and error done in conjunction with previous handovers, (ii) an analytical calculation based on wave propagation, and/or (iii) previously received signal strength indicator (RSSI) and/or reference signal received power (RSRP) measurements done in conjunction with the respective base station nodes.

8. The system of claim 1, wherein at least some of the visual sensors are co-located, as a sequence, respectively, with the sequence of base station nodes.

9. The system of claim 8, wherein at least some of the base station nodes are co-located with city-level infrastructure comprising at least one of: (i) lighting poles, (ii) traffic poles, and/or (iii) rooftops.

10. The system of claim 8, wherein at least some of the base station nodes are pico-cells, in which the pico-cells communicate with each other and/or with the two network-enabled computers using a mesh communication topology.

11. The system of claim 1, wherein said information, regarding the current location of the specific mobile client device, is received, and then said prediction is made multiple times in conjunction with said sequence of handovers, before receiving another information regarding a new location of the specific mobile client device.

12. The system of claim 1, wherein said information regarding the current location of the specific mobile client device, received in the second network-enabled computer, via the radio-access network, comprises global navigation satellite system (GNSS) reading(s) conveyed by the specific mobile client device.

13. The system of claim 1, wherein said information regarding the current location of the specific mobile client device, received in the second network-enabled computer, via the radio-access network, comprises triangulation of a position of the specific mobile client device using radio-access-network timing measurements done in conjunction with the particular one of the base station nodes and the different one of the base station nodes, that are involved in said handover.

14. The system of claim 1, wherein said radio-access network is associated with at least one of: (i) 3G/4G/5G/6G cellular infrastructure, (ii) long-term-evolution (LTE) cellular infrastructure, and/or (iii) wifi communication infrastructure.

15. The system of claim 1, wherein said specific mobile client device comprises at least one of: (i) a smartphone, (ii) a laptop, and/or (iii) a communication device embedded in a vehicle.

16. A method for utilizing visual cues to predict handover events in conjunction with radio-access networks, comprising:

receiving, in conjunction with a radio-access network associated with a sequence of base station nodes located along a certain path, information regarding a current location of a mobile client device currently on the move along said path and currently attached to one of the base station nodes;

detecting, using a sequence of visual sensors located along said path, a moving object that is within no more than 10 (ten) meters from said current location, while assuming that the mobile client device is in and/or with the moving object detected;

tracking, using the sequence of visual sensors, the moving object along said path; and initiating a sequence of handover events, in which each of the handover events is initiated when the moving object has been tracked to arrive at one of a list of locations along the path that are designated as handover locations, wherein said moving object requires a sequence of at least 10 (ten) handovers over a period of less than 100 (one hundred) seconds.

17. The method of claim 16, wherein each of the handover locations is a location between two of the base station nodes that are adjacent, and that was previously determined to be an optimal location for performing a handover in conjunction with the respective two of the base station nodes.

* * * * *